United States Patent
Siba et al.

(10) Patent No.: US 8,880,922 B2
(45) Date of Patent: Nov. 4, 2014

(54) COMPUTER AND POWER MANAGEMENT SYSTEM FOR COMPUTER

(75) Inventors: Yuuitirou Siba, Zama (JP); Hidenori Ito, Hadano (JP)

(73) Assignee: Hitachi, Ltd., Tokyo (JP)

( * ) Notice: Subject to any disclaimer, the term of this patent is extended or adjusted under 35 U.S.C. 154(b) by 640 days.

(21) Appl. No.: 13/147,518

(22) PCT Filed: Mar. 5, 2009

(86) PCT No.: PCT/JP2009/054164
§ 371 (c)(1),
(2), (4) Date: Aug. 30, 2011

(87) PCT Pub. No.: WO2010/100740
PCT Pub. Date: Sep. 10, 2010

(65) Prior Publication Data
US 2012/0017104 A1    Jan. 19, 2012

(51) Int. Cl.
*G06F 1/26* (2006.01)
*G06F 1/32* (2006.01)

(52) U.S. Cl.
CPC ............ *G06F 1/3203* (2013.01); *G06F 1/3246* (2013.01); *Y02B 60/1217* (2013.01); *Y02B 60/32* (2013.01)
USPC ........... 713/323; 713/300; 713/320; 340/511; 340/527; 714/47.1; 714/47.2

(58) Field of Classification Search
USPC .................. 713/300, 320, 323; 340/511, 527; 714/47.1, 47.2
See application file for complete search history.

(56) References Cited

U.S. PATENT DOCUMENTS

| 7,705,721 B1* | 4/2010 | Chen et al. ................. 340/518 |
| 2002/0099962 A1 | 7/2002 | Nakamura |
| 2005/0022043 A1 | 1/2005 | Yamaji et al. |
| 2005/0283624 A1 | 12/2005 | Kumar et al. |
| 2007/0143635 A1 | 6/2007 | Hughes et al. |
| 2008/0077817 A1 | 3/2008 | Brundridge et al. |

FOREIGN PATENT DOCUMENTS

| GB | 2404054 A1 | 1/2005 |
| GB | 2437846 A1 | 11/2007 |
| JP | 10-268986 A | 10/1998 |
| JP | 2000-330673 A | 11/2000 |
| JP | 2002-222031 A | 8/2002 |
| JP | 2004-213503 A | 7/2004 |
| JP | 2005-202506 A | 7/2005 |
| JP | 2008-083841 A | 4/2008 |

* cited by examiner

*Primary Examiner* — Michael J Brown
(74) *Attorney, Agent, or Firm* — Mattingly & Malur, PC

(57) ABSTRACT

The power consumption of a computer is dynamically managed independent of the OS or applications and without any delay time caused by system control. A blade server has server blades each including a processor, a power-saving control unit and a power sensor unit; a power supply box that supplies power to the server blades; and a single service processor which defines an electric current consumption upper limit value in the power sensor unit via the power-saving control unit of each server blade. When the electric current consumption of the server blades exceeds the electric current consumption upper limit value, a signal outputted by the power sensor unit is communicated to the processor, the operating frequency of the processor is controlled, and the maximum average power is controlled to be at or below the power consumption upper limit value.

13 Claims, 7 Drawing Sheets

COMPUTER AND POWER MANAGEMENT SYSTEM FOR COMPUTER

TECHNICAL FIELD

The present invention relates to a power management technique for managing the power consumption of a computer; e.g., a PC server or each server blade incorporated into a blade server.

BACKGROUND ART

The term blade server refers to a system board in which processors, memory, I/Os, etc., are densely mounted on a single mother board. In addition, the term blade server refers to a server system which saves space and reduces the total cost of implementation and management while leaving its basic functions as a PC server intact by housing a plurality of server blades in a single chassis and sharing the chassis, power sources, fans, cables, etc. It is noted that this definition is also applicable to the present invention.

Since each server blade within a blade server is equipped with basic functions as a PC server, it is possible to have each server blade run a different OS or application. With respect to power management systems for blade servers, by way of example, there are such related techniques as those disclosed in Patent Documents 1 and 2. With respect to Patent Document 1, a special management controller for power consumption management manages the overall power consumption of the server blades within a chassis. With respect to Patent Document 2, the power consumption of a server blade is managed by having a management controller mounted on the server blade switch CPU operation speeds.

Patent Document 1: JP Patent Application Publication (Kokai) No. 2005-202506 A
Patent Document 2: JP Patent Application Publication (Kokai) No. 2008-83841 A

DISCLOSURE OF THE INVENTION

Problems to be Solved by the Invention

Greater demands with respect to processor performance are beginning to be placed on blade servers as well, and there are now signs that the use of the newest processors is being considered. However, when one attempts to densely mount server blades that use processors that operate at high frequencies, power consumption problems arise. High-frequency processors, naturally, consume greater power, and as more of them are mounted, there would be constraints as to where they may be installed. For this reason, a system for defining an upper limit value with respect to server blade power consumption and for controlling the maximum average power to be at or below that upper limit value becomes necessary. In addition, such a power control system would be expected to control, in the event that the defined upper limit value is exceeded, the maximum average power to be at or below the upper limit value as quickly as possible. This expectation with respect to power consumption control similarly applies to other computers as well, such as PC servers, etc., in which high-performance processors are mounted.

The present invention provides a power management method that manages the power consumption of a computer to be at or below a defined power consumption upper limit value without any delay time caused by system control.

Means for Solving the Problems

A computer of the present invention comprises: a processor having a normal mode that operates at a first frequency and a power-saving mode that operates at a second frequency that is lower than the first frequency; a power-saving control unit; and a power sensor unit that measures power consumption, wherein the power sensor unit compares a power consumption upper limit value defined by the power-saving control unit with measured power consumption, and outputs an interrupt signal to the processor if the measured power consumption exceeds the power consumption upper limit value, and when the interrupt signal is inputted, the processor switches from the normal mode to the power-saving mode.

Further, a power management method for a computer according to the present invention is directed to a computer that comprises a processor having a normal mode that operates at a first frequency and a power-saving mode that operates at a second frequency that is lower than the first frequency, a power-saving control unit, and a power sensor unit that measures power consumption, the power management method comprising: a step of defining a power consumption upper limit value for the computer; a step of comparing power consumption measured by the power sensor unit with the power consumption upper limit value, and of outputting an interrupt signal from the power sensor unit to the processor when the measured power consumption exceeds the power consumption upper limit value; and a step in which the processor switches from the normal mode to the power-saving mode upon reception of the interrupt signal.

According to the present invention, it is possible to control processor frequency without system control.

Effects of the Invention

The present invention allows for dynamic power management for a computer which is without any delay time caused by system control and is superior in power upper limit value control performance.

LIST OF REFERENCE NUMERALS

Figure 1:
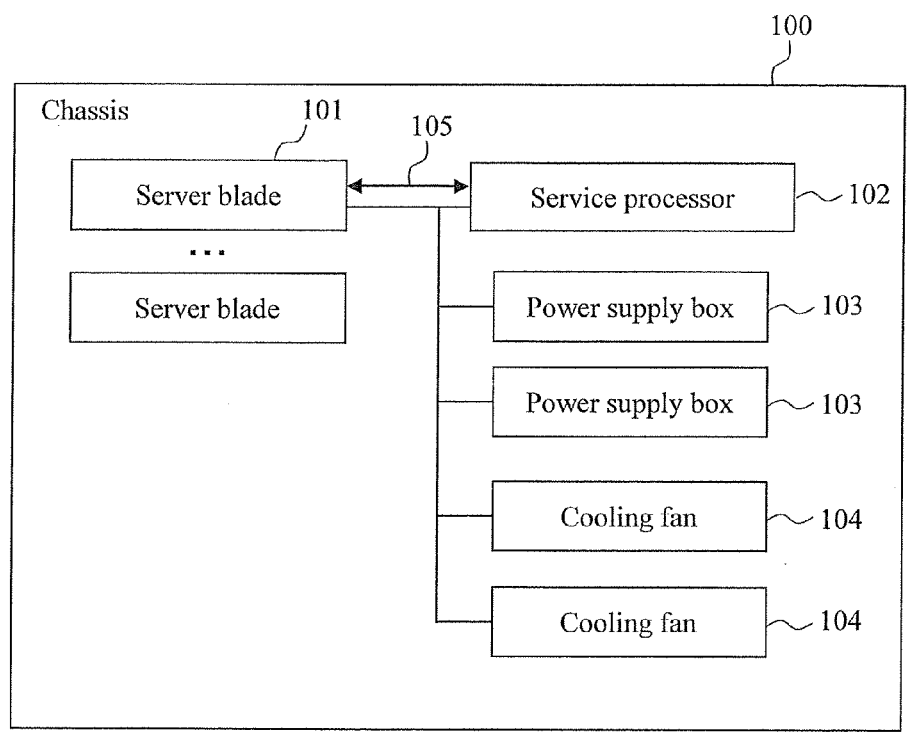
FIG. 1 is a schematic view showing the overall configuration of a blade server.

100 Chassis
101 Server blade
102 Service processor
103 Power supply box
104 Cooling fan
105 Management bus within chassis
200 Power sensor unit
201 Power-saving control unit
202 Power-measuring resistor
203 Power-measuring controller 204 Management controller
205 Processor
206 Power supply wire
207 Electric current upper limit value excess indicator signal
208 Processor frequency reduction indicator signal
209 Processor frequency reduction maintenance signal
210 Management bus within server
400 Southbridge
401 Processor state controlling management bus
402 Processor state controlling bus

BEST MODE FOR CARRYING OUT THE INVENTION

Embodiments of the present invention are described below with reference to the drawings. Descriptions are provided below chiefly with respect to power management for server blades mounted on a blade server. However, the present invention is not limited to blade servers, and is applicable to power management for other computers as well, such as stand-alone PC servers, etc.

FIG. 1 is a schematic view showing the overall configuration of a blade server. The blade server is such that a plurality of server blades 101 are loaded within one chassis 100, and one service processor 102 is connected via a backplane board connected to the rear faces of the server blades 101. A plurality of power supply boxes 103 and cooling fans 104 are disposed towards the rear in the chassis. The server processor 102 detects the temperature within the chassis via the backplane board, and controls the rotation speeds of the cooling fans 104. The power supply boxes 103 supply power to the server blades 101, the service processor 102, the cooling fans 104, etc. Further, the service processor 102 is capable of accessing each of the server blades 101 via a management bus 105 within the chassis.

Figure 2:
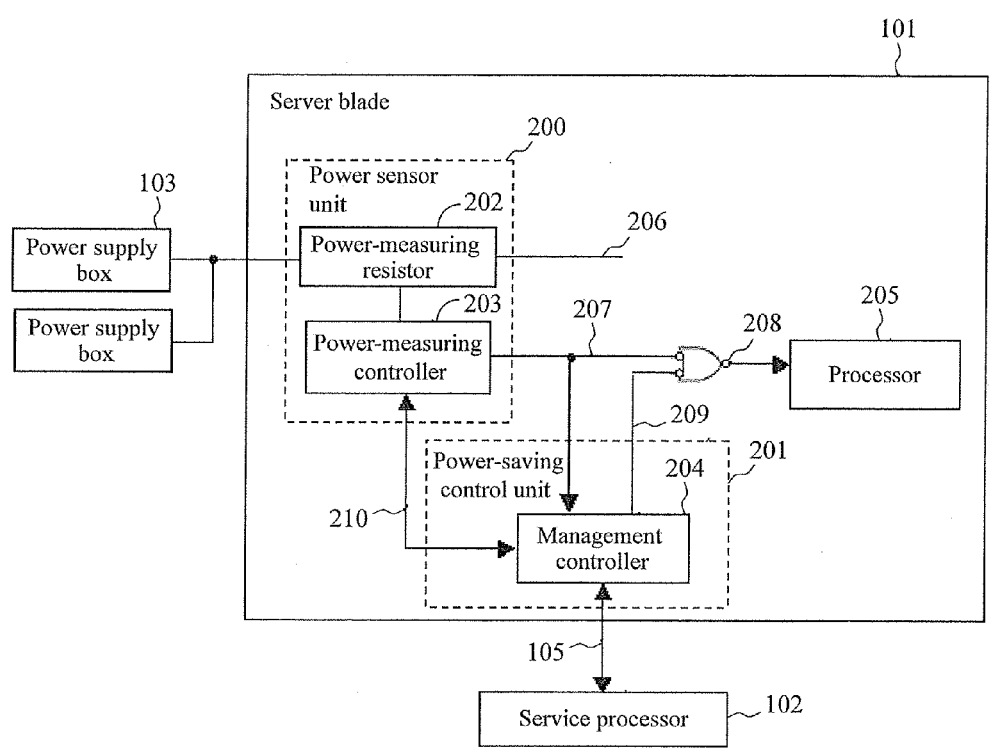
FIG. 2 is a system configuration diagram showing the first embodiment of a power management system according to the present invention.

FIG. 2 is a system configuration diagram showing the first embodiment of a power management system according to the present invention. A power sensor unit 200, a power-saving control unit 201, and a processor 205 are built into the server blade 101. It is noted that, although not shown in the figure, a power supply wire 206 is connected to each of the devices within the server blade 101. The term device as used herein refers to the processor 205, a power-measuring controller 203, a management controller 204, etc. As operation modes, the processor 205 has a normal mode that operates at a high frequency, and a power-saving mode that operates at a frequency that is lower than that.

The power sensor unit 200 comprises a power-measuring resistor 202 and the power-measuring controller 203. The power-saving control unit 201 comprises the management controller 204. The service processor 102 is able to access the management controller 204 via the management bus 105 within the chassis. Via a management bus 210 within the blade, the management controller 204 defines an electric current upper limit value with respect to the power-measuring controller 203, and deactivates the outputting of an electric current upper limit value excess indicator signal 207 from the power-measuring controller 203. In addition, the management controller 204 also has a function of outputting a processor frequency reduction maintenance signal 209, as well as a function of monitoring for the electric current upper limit value excess indicator signal 207. From the perspective of the processor 205, the processor frequency reduction maintenance signal 209 is a signal comparable to the electric current upper limit value excess indicator signal 207 from the power-measuring controller 203.

The power-measuring controller 203 simultaneously measures the input-side voltage value of, and the value of the electric current flowing through, the power-measuring resistor 202, and when it detects that the electric current value has exceeded the defined electric current upper limit value, it outputs the electric current upper limit value excess indicator signal 207. The electric current upper limit value excess indicator signal 207 is deactivated when a deactivation signal is inputted to the power-measuring controller 203 from the management controller 204.

In the present embodiment, the electric current upper limit value excess indicator signal 207 is a level signal that is defined as high or low only, and the power-controlling controller 203 outputs a Low when it detects that the defined electric current upper limit value has been exceeded. The electric current upper limit value excess indicator signal 207 is inputted to the processor 205 as a processor frequency reduction indicator signal (interrupt signal) 208, and is also simultaneously inputted to the management controller 204 as well. The processor frequency reduction indicator signal 208 may be, by way of example, a processor hot signal. The processor 205 has a function whereby, when the frequency reduction indicator signal 208 is inputted, it transitions from the normal mode, in which it had been operating at a high frequency, to the power-saving mode referred to as P-state in which the operating frequency is reduced. By way of example, in a power management system of the present embodiment, the frequency reduction indicator signal 208 is a Low-active signal, and the processor 205 transitions to the P-state when the frequency reduction indicator signal 208 is inputted at Low, thus operating at a certain frequency that is lower than that during normal operation.

Figure 3:
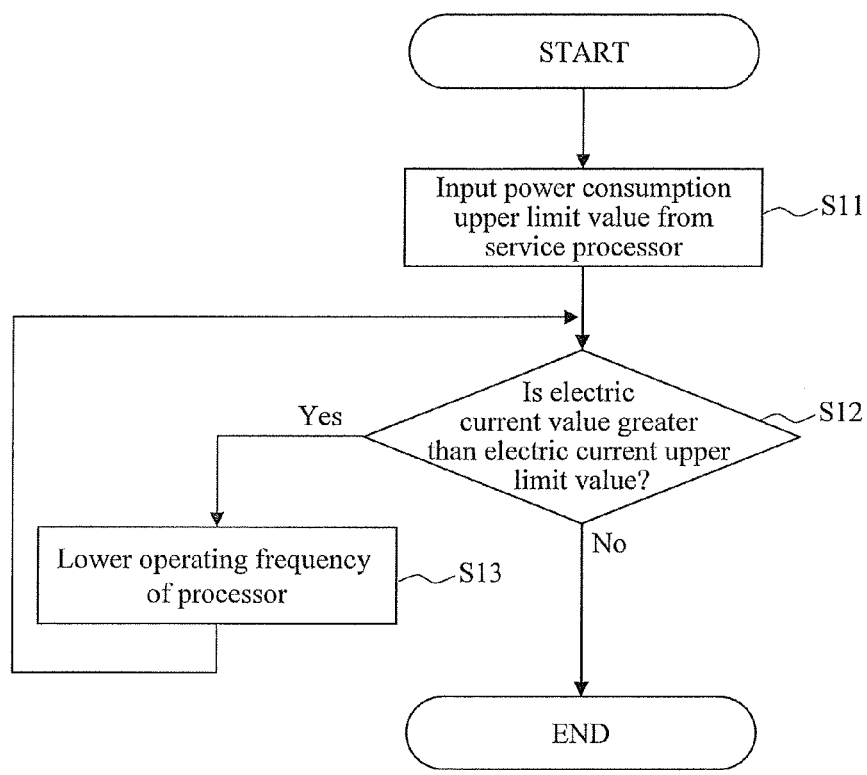
FIG. 3 is a flowchart generally illustrating the operations of a power management system of the present invention.

FIG. 3 is a flowchart generally illustrating the operation of a power management system of the present invention. When a power consumption upper limit value for the server is indicated via a management program of the service processor 102 in accordance with the user's use environment (S11), the service processor 102 indicates the power consumption upper limit value to the management controller 204 within the server blade via the management bus 105 within the chassis. The management controller 204 defines in the power-measuring controller 203 an electric current upper limit value computed from the power consumption upper limit value. The power-measuring controller 203 compares the electric current upper limit value with the value of the electric current flowing through the power-measuring resistor 202 (S12), and if the measured electric current value exceeds the upper limit value, lowers the operating frequency of the processor 205 to transition from normal mode to power-saving mode, thereby reducing power consumption (S13).

Figure 4:
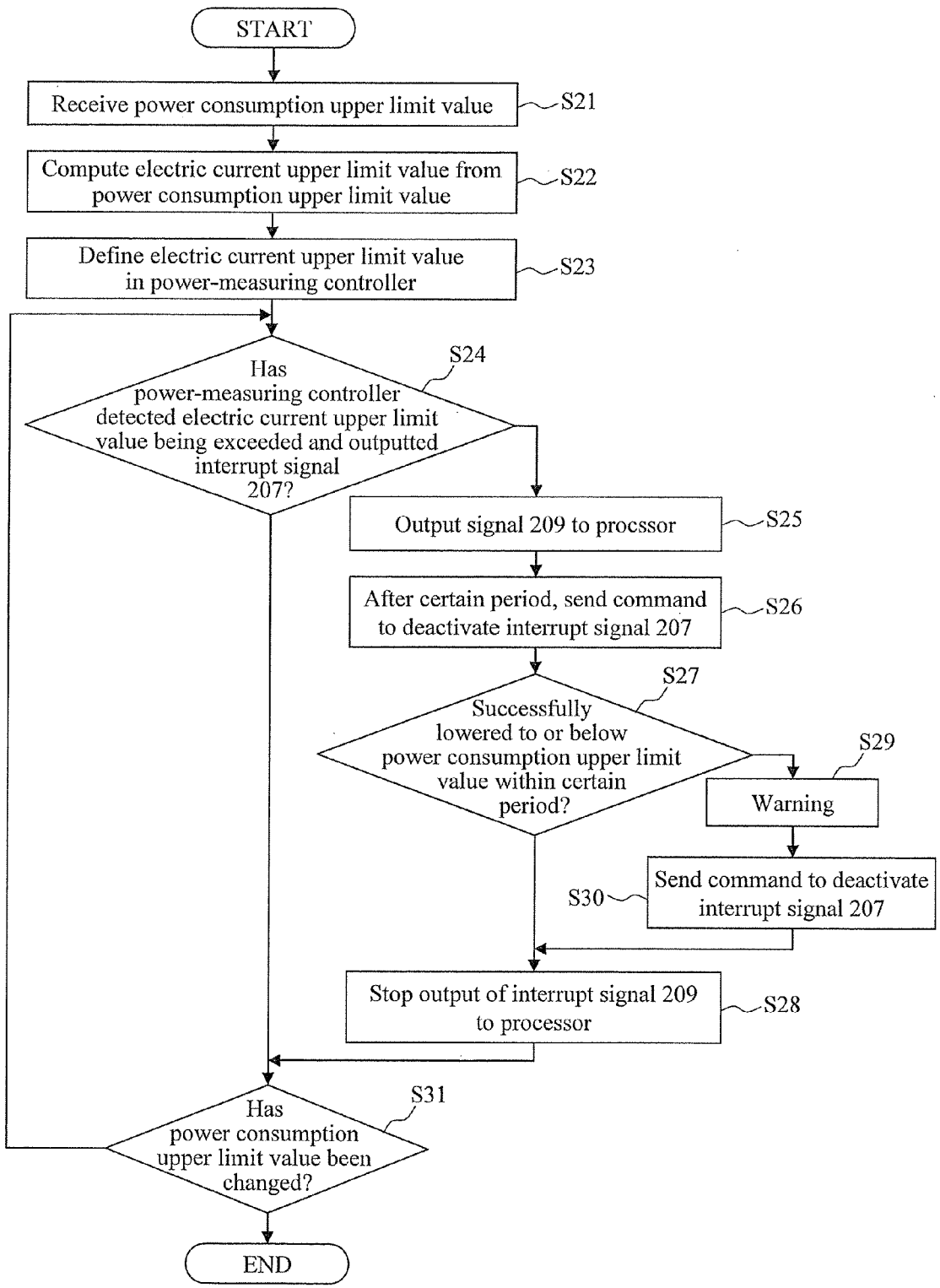
FIG. 4 is a flowchart showing the operations of a management controller with respect to the first embodiment.

FIG. 4 is a flowchart showing the details of the operation of a management controller.

As the user specifies a power consumption upper limit value for the server blade to the management controller 204 from the service processor 102 (S21), the management controller 204 computes an electric current upper limit value from the defined power consumption upper limit value (S22). Specifically, it divides the power consumption upper limit value by the input voltage value, and uses a value with a margin of reading error as the electric current upper limit value. The management controller 204 defines the electric current upper limit value in the power-measuring controller 203 via a management bus 210 within the server (S23). Initially, the processor 205 operates in normal mode whose operating frequency is high. The power-measuring controller 203 compares the value of the electric current flowing through the power-measuring resistor 202 with the defined electric current upper limit value, and, when it detects that the measured electric current value has exceeded the defined upper limit value, outputs the electric current upper limit value excess indicator signal 207 towards the processor 205 and the management controller 204 (S24). It is noted that, even while it is outputting the electric current upper limit value excess indicator signal 207, the power-measuring controller 203 continues to measure the input-side voltage value of, and the value of the electric current flowing through, the power-measuring resistor 202.

The electric current upper limit value excess indicator signal 207 directed to the processor 205 becomes the processor frequency reduction indicator signal 208, which is an interrupt signal to the processor. As the processor frequency reduction indicator signal 208 is inputted as an interrupt signal, the processor 205 transitions to the P-state, which is the power-saving mode, and operates at a reduced frequency. On the other hand, as the electric current upper limit value excess indicator signal 207 is inputted to the management controller 204, the management controller 204 instantly outputs the processor frequency reduction maintenance signal 209 (S25). To the processor, the processor frequency reduction maintenance signal 209 is a signal that is equivalent to the electric current upper limit value excess indicator signal 207, and as a result of the processor frequency reduction maintenance signal 209 being outputted, the processor frequency reduction indicator signal 208 maintains a Low-state even when the electric current upper limit value excess indicator signal 207 is deactivated, and the processor 205 operates in power-saving mode with its frequency reduced while still in the P-state.

After outputting the processor frequency reduction maintenance signal 209, the management controller 204 deactivates, after a certain period and via the management bus 210 within the server, the electric current upper limit value excess indicator signal 207 that the power-measuring controller 203 is outputting (S26). Once the outputting of the electric current upper limit value excess indicator signal 207 is deactivated, the power-measuring controller 203 makes a comparison to see if the measured electric current value exceeds the upper limit value, and if the upper limit value is exceeded, it once again outputs the electric current upper limit value excess indicator signal 207. By checking to see if the electric current upper limit value excess indicator signal 207 is inputted again after the electric current upper limit value excess indicator signal 207 has been deactivated, the management controller 204 checks if the electric current value has been successfully reduced to or below the electric current upper limit value (S27).

First, to explain a case where the electric current upper limit value excess indicator signal 207 is not inputted to the management controller 204, the management controller 204 deactivates the outputting of the processor frequency reduction maintenance signal 209 (S28). As the outputting of the processor frequency reduction indicator signal 208 is deactivated, the processor 205 returns to normal mode, which has the higher operating frequency from before control was effected. On the other hand, in the determination in step 27, if the electric current upper limit value excess indicator signal 207 has been inputted, the management controller gives a warning (S29), deactivates the outputting of the electric current upper limit value excess indicator signal 207 (S30), and thereafter deactivates the processor frequency reduction maintenance signal 209 (S28), and the processor 205 thereby returns to normal mode, which has the higher operating frequency from before control was effected.

The management controller 204 then checks to see if the power consumption upper limit value defined by the service processor 102 has been changed (S31). If no change has been made to the power consumption upper limit value, returning to step 24, the management controller 204 transitions to monitoring the electric current upper limit value excess indicator signal 207. On the other hand, if there has been a change to the power consumption upper limit value, returning to step 21, the service processor 102 again defines the power consumption upper limit value in the management controller 204. Power management is thus performed by repeating the series of processes above.

Figure 5:
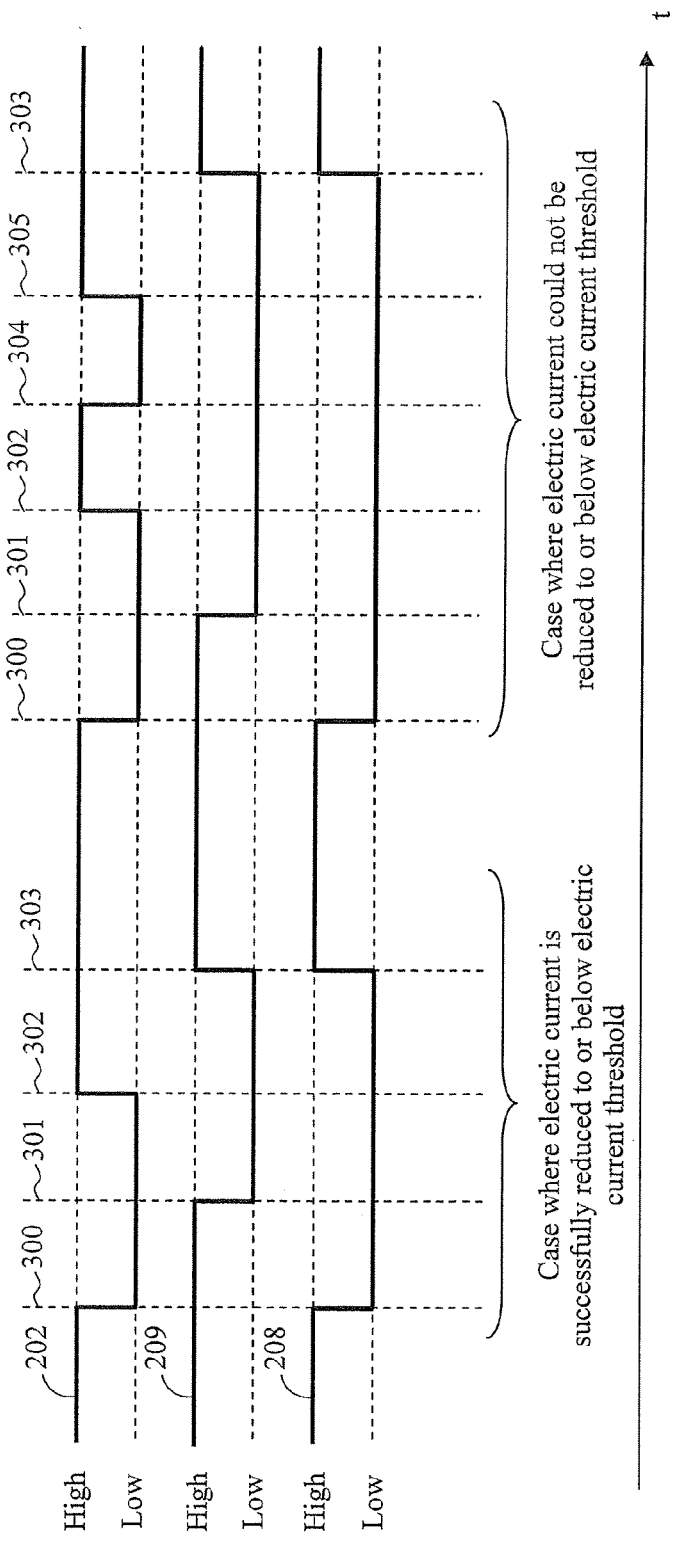
FIG. 5 is a chart showing time sequences of signals for reducing processor frequency.

FIG. 5 is a chart showing time sequences of various signals for reducing processor frequency by means of a power management system.

As a Low output of the electric current upper limit value excess indicator signal 207 is made at electric current upper limit value excess indicator signal output time 300, a Low output of the processor frequency reduction indicator signal 208 is made almost simultaneously. As the management controller 204 then detects an output of the electric current upper limit value excess indicator signal 207, it outputs the processor frequency reduction maintenance signal 209 at processor frequency reduction maintenance signal output time 301. After the processor frequency reduction maintenance signal 209 has been outputted, the management controller 204 deactivates the electric current upper limit value excess indicator signal 207 at electric current upper limit value excess indicator signal deactivation time 302.

After a certain period has lapsed from processor frequency reduction maintenance signal output time 301, the management controller 204 then monitors the output of the electric current upper limit value excess indicator signal 207. If it is confirmed that it is not being outputted at Low, the processor frequency reduction indicator signal 208 returns to High by having the processor frequency reduction maintenance signal 209 deactivated at processor frequency reduction maintenance signal deactivation time 303.

On the other hand, if, after a certain period has lapsed from processor frequency reduction maintenance signal output time 301, the management controller 204 confirms, at electric current upper limit value excess indicator signal re-output time 304, that the electric current upper limit value excess indicator signal 207 is being outputted at Low, it deactivates the electric current upper limit value excess indicator signal 207 at electric current upper limit value excess indicator signal re-deactivation time 305. The processor frequency reduction indicator signal 208 then returns to High by having the processor frequency reduction maintenance signal 209 deactivated at processor frequency reduction maintenance signal deactivation time 303.

Figure 6:
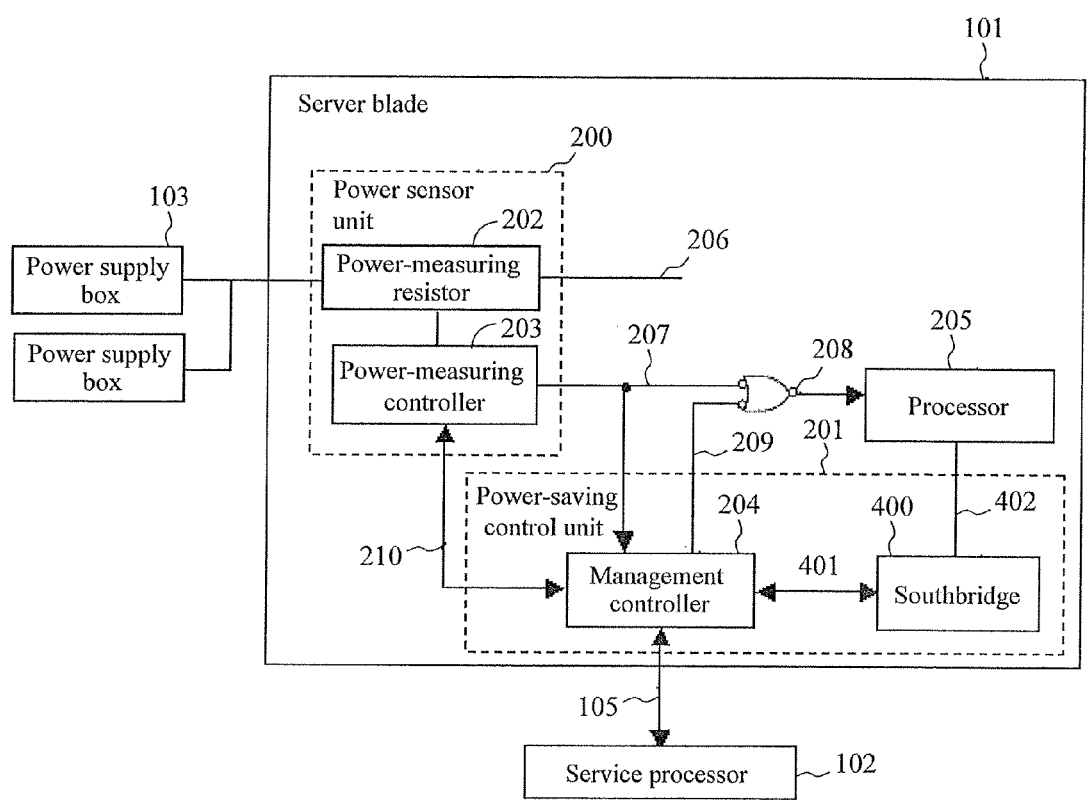
FIG. 6 is a system configuration diagram showing the second embodiment of a power management system according to the present invention.

FIG. 6 is a system configuration diagram showing the second embodiment of a power management system according to the present invention. The second embodiment differs from the first embodiment in terms of the configuration of the power-saving control unit. The power-saving control unit 201 of the present embodiment comprises the management controller 204 and a southbridge 400. When a power control request is made from the management controller 204 via a processor state controlling management bus 401, the southbridge 400 causes, using a processor state controlling bus 402, the processor 205 to transition to a T-state, which is an operating state with a reduced operating frequency (power-saving mode). To provide a specific example, the management controller 204 causes, via a PECI (Platform Environmental Control Interface) between the processor 205 and the southbridge 400, the operating frequency of the processor 205 to transition to the T-state, which allows for a reduction down to 12.5% of the operating frequency of the P-state, and thus reduces the operating frequency of the processor 205 to 12.5% of that of normal mode.

In the second embodiment, power control for the processor 205 is performed using the processor frequency reduction indicator signal 208 as in the first embodiment. In this control, when reduction to or below the electric current upper limit value is not possible, the management controller 204 outputs a power control request to the southbridge 400 via the processor state controlling management bus 401. The southbridge 400 then causes, via the processor state controlling bus 402, the processor 205 to transition to the T-state to reduce power.

Figure 7:
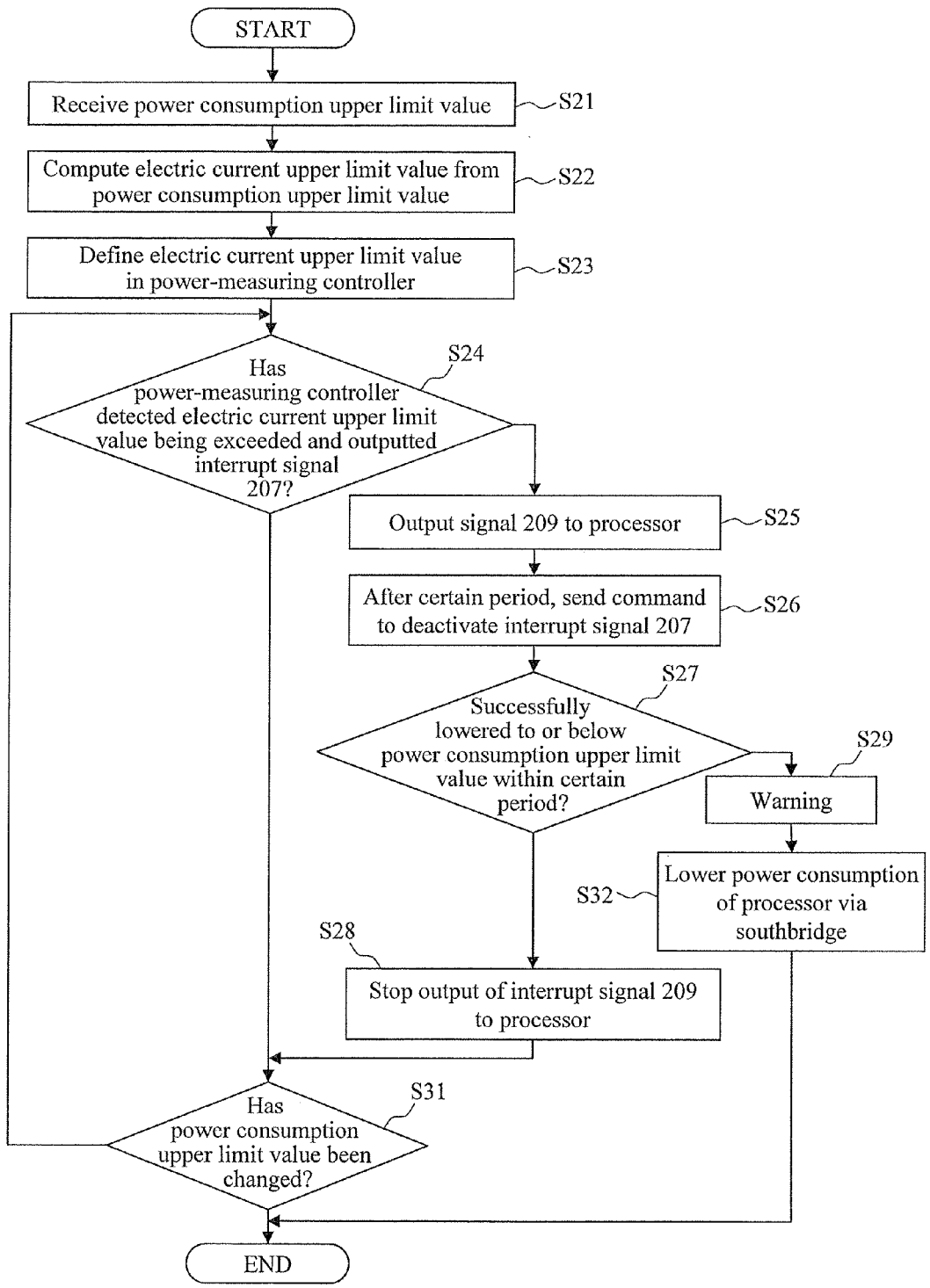
FIG. 7 is a flowchart showing the operations of a management controller with respect to the second embodiment.

Operations of the management controller 204 with respect to the second embodiment will be described with reference to FIG. 7. The control flow of from step 21 to step 31 shown in FIG. 7 is the same as that in the first embodiment, and a detailed description thereof will therefore be omitted. The control subsequent to step 29 will be described.

After giving a warning (S29), the management controller 204 outputs a power control request to the southbridge 400 via the processor state controlling management bus 401. The southbridge 400 causes, via the processor state controlling bus 402, the processor 205 to transition to the T-state and thus reduces the operating frequency of the processor 205 (S32).

Thus, in the case of a blade server, the service processor 102, whose purpose is, among others, to detect the temperature within the chassis via the backplane board and to control the rotation speeds of the fans, defines an electric current upper limit value in the power-measuring controller 203 via the management controller 204. It is thus possible to control the operating frequency of the processor 205 by means of the electric current upper limit value excess indicator signal 207 outputted from the power-measuring controller 203 when the power of the server blades 101 exceeds the power consumption upper limit value. In the case of this control, since the control signal is inputted directly to the processor 205 from the power-controlling controller 203 without having to go through the management controller 204, there is no delay time caused by system control.

According to the present invention, by defining, from the service processor 102, the power consumption upper limit value for the plurality of server blades 101 mounted within the chassis, it is possible to keep the power of the server blades 101 at or below the power consumption upper limit value without any delay time caused by system control. By virtue of the fact that there is no delay time caused by system control, it is possible to shorten the time it takes to, from when the electric current upper limit value is exceeded, bring it down to or below the electric current upper limit value, which is advantageous over conventional methods from the perspective of power upper limit value control.

Descriptions have been provided above with respect to power control for server blades mounted on a blade server. If the server for which power control is to be performed is a single independent PC server instead of a blade server, the power consumption upper limit value is inputted to the power-saving control unit 201 via the management controller 204 instead of a service processor. The inputted electric current consumption upper limit value is defined in the power-measuring controller 203, and power control for the PC server is carried out through processes similar to those discussed above.

The invention claimed is:

1. A computer comprising:
a processor having a normal mode that operates at a first frequency and a power-saving mode that operates at a second frequency that is lower than the first frequency;
a power-saving control unit;
a power sensor unit that measures power consumption; and
a path for supplying an interrupt signal from the power sensor unit to the power-saving control unit, wherein
the power sensor unit compares a power consumption upper limit value defined by the power-saving control unit with measured power consumption, and outputs the interrupt signal directly to the processor and to the power-saving control unit if the measured power consumption exceeds the power consumption upper limit value,
when the interrupt signal is inputted, the power saving control unit outputs to the processor a signal that is equivalent to the interrupt signal and outputs to the power sensor unit an instruction to the power sensor unit to deactivate the interrupt signal;
when the interrupt signal or the signal that is equivalent to the interrupt signal is inputted, the processor switches from the normal mode to the power-saving mode, the power sensor unit:
once the outputting of the interrupt signal is deactivated by the instruction to deactivate the interrupt signal, compares the power consumption upper limit value with a power consumption measured after outputting the interrupt signal;
if the power consumption measured after outputting the interrupt signal exceeds the power consumption upper limit value, re-outputs the interrupt signal to the processor and to the power-saving control unit;
if the power consumption measured after outputting the interrupt signal is at or below the power consumption upper limit value, does not re-output the interrupt signal to the processor and to the power-saving control unit; and
the power-saving control unit, if the interrupt signal is not re-inputted from the power sensor unit after the instruction to deactivate the interrupt signal, deactivates the signal that is equivalent to the interrupt signal.

2. A computer according to claim 1, wherein the interrupt signal comprises a processor hot signal.

3. A computer according to claim 1, wherein the computer comprises a server blade mounted on a blade server.

4. A computer according to claim 1, wherein the power sensor unit comprises a power-measuring resistor.

5. A computer according to claim 1, wherein, in the event that the power consumption of the computer exceeds the power consumption upper limit value even after the processor has switched to the power-saving mode due to the interrupt signal to the processor,
the interrupt signal is re-inputted from the power sensor unit to the power-saving control unit after the instruction to deactivate the interrupt signal, and the power-saving control unit reduces the frequency of the processor via a platform environmental control interface of the processor.

6. A computer system comprising, within one chassis, a power source, a plurality of computers according to claim 1, and a cooling fan.

7. A computer system according to claim 6, further comprising a service processor that controls the cooling fan, wherein
the power consumption upper limit value for each of the computers is defined from the service processor with respect to the power sensor unit via the power-saving control unit of each of the computers.

8. A computer system according to claim 6, wherein the interrupt signal comprises a processor hot signal.

9. A computer system according to claim 6, wherein, in the event that the power consumption of the computers exceeds the power consumption upper limit value even after the processor has been placed in the power-saving mode with the interrupt signal to the processor,
the interrupt signal is re-inputted from the power sensor unit to the power-saving control unit after the instruction to deactivate the interrupt signal, and the power-saving control unit reduces the frequency of the processor via a platform environmental control interface of the processor.

10. A power management method for a computer having a processor having a normal mode that operates at a first frequency and a power-saving mode that operates at a second frequency that is lower than the first frequency, a power-saving control unit, a power sensor unit that measures power consumption, and a path for supplying an interrupt signal from the power sensor unit to the power-saving control unit, the power management method comprising:
a step of defining a power consumption upper limit value for the computer;
a step of comparing power consumption measured by the power sensor unit with the power consumption upper limit value, and of outputting an interrupt signal from the power sensor unit directly to the processor and to the power-saving control unit when the measured power consumption exceeds the power consumption upper limit value;
a step of receiving by the power-saving control unit the interrupt signal and outputting to the processor a signal that is equivalent to the interrupt signal;
a step of outputting by the power-saving control unit to the power sensor unit an instruction to the power sensor unit to deactivate the interrupt signal, after outputting the signal that is equivalent to the interrupt signal;
a step of switching by the processor from the normal mode to the power-saving mode upon reception of the interrupt signal or of the signal that is equivalent to the interrupt signal;
a step of receiving by the power sensor unit the instruction to deactivate the interrupt signal, and once the outputting of the interrupt signal is deactivated, comparing the power consumption upper limit value with a power consumption measured after outputting the interrupt signal;
a step of re-outputting by the power sensor unit, if the power consumption measured after outputting the interrupt signal exceeds the power consumption upper limit value, the interrupt signal to the processor and the power-saving control unit;
a step of not outputting by the power sensor unit, if the power consumption measured after outputting the interrupt signal is at or below the power consumption upper limit value, the interrupt signal to the processor and the power-saving control unit; and
a step of deactivating by the power-saving control unit, if the interrupt signal is no re-inputted from the power sensor unit after the instruction to deactivate the interrupt signal, the signal that is equivalent to the interrupt signal.

11. A power management method for a computer according to claim 10, wherein, in the event that the power consumption exceeds the power consumption upper limit value even after the processor has switched to the power-saving mode due to the interrupt signal,
the interrupt signal is re-inputted from the power sensor unit to the power-saving unit after the instruction to deactivate the interrupt signal, and the power-saving control unit reduces the frequency of the processor via a platform environmental control interface of the processor.

12. A power management method for a computer according to claim 10, further comprising:
a step of outputting to the processor from the power-saving control unit, after the interrupt signal has been outputted, a signal that is equivalent to the interrupt signal; and
a step of outputting by the power-saving control unit to the power sensor unit a signal that deactivates the interrupt signal.

13. A power management method for a computer according to claim 10, wherein the computer is one of a plurality of server blades mounted on a blade server, and the power consumption upper limit value is defined from a service processor.

* * * * *